(12) United States Patent
Furukawa et al.

(10) Patent No.: US 11,513,502 B2
(45) Date of Patent: Nov. 29, 2022

(54) MACHINE TOOL APPARATUS FOR APPLYING INFORMATION TO A SURFACE OF A WORKPIECE DURING MANUFACTURING-RELATED OPERATIONS

(71) Applicant: FUJI CORPORATION, Chiryu (JP)

(72) Inventors: Kazuya Furukawa, Chiryu (JP); Kazuyoshi Nagato, Toyoake (JP); Shigefumi Suzuyama, Toyota (JP)

(73) Assignee: FUJI CORPORATION, Chiryu (JP)

( * ) Notice: Subject to any disclaimer, the term of this patent is extended or adjusted under 35 U.S.C. 154(b) by 154 days.

(21) Appl. No.: 16/648,956

(22) PCT Filed: Oct. 17, 2017

(86) PCT No.: PCT/JP2017/037516
§ 371 (c)(1),
(2) Date: Mar. 19, 2020

(87) PCT Pub. No.: WO2019/077676
PCT Pub. Date: Apr. 25, 2019

(65) Prior Publication Data
US 2020/0257272 A1    Aug. 13, 2020

(51) Int. Cl.
*G05B 19/418*     (2006.01)
*B25J 9/16*        (2006.01)
*B25J 9/00*        (2006.01)
*G06Q 50/04*       (2012.01)

(52) U.S. Cl.
CPC ........ *G05B 19/4183* (2013.01); *B25J 9/0084* (2013.01); *B25J 9/1679* (2013.01);
(Continued)

(58) Field of Classification Search
CPC ...... G05B 19/4183; G05B 2219/32046; G05B 2219/32049; G05B 2219/32055;
(Continued)

(56) References Cited

U.S. PATENT DOCUMENTS 7,764,191 B2 *   7/2010   Hall ................... G05B 19/4183
                                               340/12.51
2007/0173970 A1 *   7/2007   Shachar ............... G05B 19/128
                                               700/225
(Continued)

FOREIGN PATENT DOCUMENTS

JP           6-106463 A      4/1994
JP        2009-255212 A     11/2009
(Continued)

OTHER PUBLICATIONS

International Search Report dated Dec. 19, 2017 in PCT/JP2017/037516 filed Oct. 17, 2017, 1 page.

*Primary Examiner* — M. N. Von Buhr
(74) *Attorney, Agent, or Firm* — Oblon, McClelland, Maier & Neustadt, L.L.P.

(57) ABSTRACT

The machine tool apparatus comprises: multiple work machine modules configured to sequentially perform a series of manufacturing-related operations on a workpiece; a robot configured to convey the workpiece between the multiple work machine modules; an individual information-providing device configured to provide an individual information to the workpiece conveyed into the multiple work machine modules and subjected to manufacturing-related operations; a storage device; and a control device configured to link the manufacturing history of manufacturing-related operations performed on the workpiece by the multiple work machine modules and store the information in the storage section, the workpiece being a workpiece to which the individual information was provided by the individual information-providing device.

3 Claims, 5 Drawing Sheets

(52) U.S. Cl.
CPC ... *G06Q 50/04* (2013.01); *G05B 2219/32046* (2013.01); *G05B 2219/32049* (2013.01); *G05B 2219/32055* (2013.01); *G05B 2219/32127* (2013.01)

(58) Field of Classification Search
CPC .......... G05B 2219/32127; G05B 2219/49302; G05B 19/418; B25J 9/0084; B25J 9/1679; Y02P 90/30; Y02P 90/02; Y02P 90/083; Y02P 90/087; G06Q 50/04
See application file for complete search history.

(56) References Cited

U.S. PATENT DOCUMENTS

| | | | |
|---|---|---|---|
| 2007/0288306 A1* | 12/2007 | Ohishi | G06Q 10/06 700/113 |
| 2008/0109096 A1* | 5/2008 | Jann | G05B 19/4188 700/96 |
| 2012/0101758 A1* | 4/2012 | Ogi | G05B 19/41875 702/81 |
| 2012/0146794 A1* | 6/2012 | Shachar | G05B 19/4183 340/572.1 |
| 2014/0188264 A1* | 7/2014 | Rajagopal | G05B 19/41865 700/121 |
| 2017/0079169 A1 | 3/2017 | Morita | |
| 2017/0153616 A1* | 6/2017 | Sakakibara | G05B 19/41875 |

FOREIGN PATENT DOCUMENTS

| | | |
|---|---|---|
| JP | 2016-446 A | 1/2016 |
| WO | WO 2015/132905 A1 | 9/2015 |

\* cited by examiner

MACHINE TOOL APPARATUS FOR APPLYING INFORMATION TO A SURFACE OF A WORKPIECE DURING MANUFACTURING-RELATED OPERATIONS

TECHNICAL FIELD

The present disclosure relates to a machine tool apparatus providing traceability.

BACKGROUND ART

Conventionally, various techniques have been proposed for machine tools providing traceability.

For example, the technique disclosed in Patent Literature 1 includes: a collection method of device operation data, which is performed with a data collection device by collecting workpiece IDs and device operation data of a manufacturing process device having a manufacturing station (i.e., a honing device), and by linking workpiece ID with device operation data; and a device operation data linking step for linking, with a data collection device, a workpiece ID and device operation data based on a transmission of a manufacturing completion signal indicating that the manufacturing process of the workpiece has been completed by the honing device, and the linking is performed during the time between the transmission of the manufacturing completion signal and a fixed point in time set in advance.

PATENT LITERATURE

Patent Literature 1: JP 2009-255212 A

BRIEF SUMMARY

Technical Problem

In the technique described in Patent Literature 1, traceability via a workpiece ID is provided for a single manufacturing device (i.e., a honing device). However, in multiple manufacturing devices included in a manufacturing station, a series of manufacturing processes may be performed or a workpiece ID may be provided, from which it is desirable to provide traceability anew for such a case.

Therefore, it is an object of the present disclosure to provide a machine tool apparatus which provides traceability for a series of manufacturing-related operations that are performed with multiple work machine modules based on an individual information provided to a workpiece via an individual information-providing device.

Solution to Problem

The present specification discloses a machine tool apparatus comprising: multiple work machine modules configured to sequentially perform a series of manufacturing-related operations on a workpiece; a robot configured to convey the workpiece between the multiple work machine modules; an individual information-providing device configured to provide an individual information to the workpiece conveyed into the multiple work machine modules and subjected to manufacturing-related operations; a storage device; and a control device configured to link the manufacturing history of manufacturing-related operations performed on the workpiece by the multiple work machine modules and store the linked manufacturing history in the storage device, the workpiece being a workpiece to which the individual information was provided by the individual information-providing device.

Advantageous Effects

According to the present disclosure, with an individual information provided to the workpiece by the individual information providing device, the machine tool apparatus provides traceability of a series of manufacturing-related operations performed by multiple work machine modules.

DESCRIPTION OF EMBODIMENTS

Figure 1:
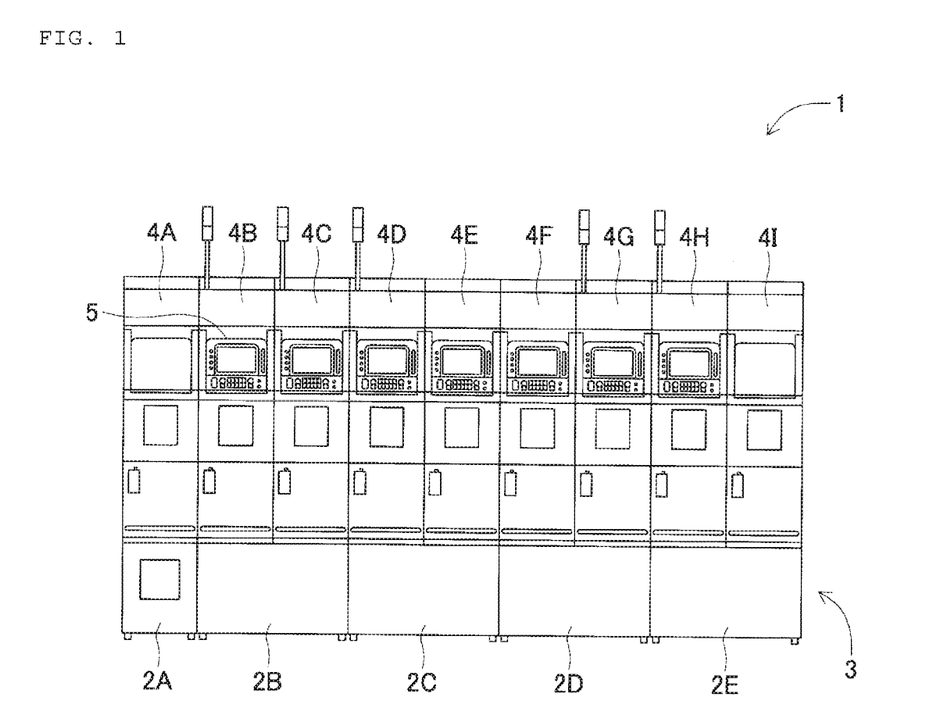
FIG. 1 is an external front view of machine tool apparatus 1 according to the present embodiment.

Hereinafter, preferred embodiments of the present disclosure will be described in detail with reference to the drawings. First, the overall configuration of machine tool apparatus 1 of the present embodiment will be described with reference to FIG. 1. FIG. 1 is an external front view of machine tool apparatus 1 of the present embodiment.

(Overall Configuration of the Machine Tool Apparatus)

As shown in FIG. 1, machine tool apparatus 1 of the present embodiment includes base 3 composed of multiple (five in FIG. 1) base units 2A to 2E, and multiple (nine in FIG. 1) work machine modules 4A to 4I arranged with respect to base 3. Normally, two work machine modules are arranged for one base unit, but configurations are possible in which only one work machine module or in which three or more work machine modules are arranged for one base unit. Further, the work machine modules may be disposed independently of base 3. For example, in the example shown in FIG. 1, one work machine module 4A is disposed in the leftmost base unit 2A, and two work machine modules 4B to 4I are disposed in the other base units 2B to 2E. In the following description, it is assumed that front-rear, left-right, and up-down correspond to front-rear, left-right, and up-down when viewed from the front of machine tool apparatus 1 of FIG. 1. That is, the direction, in which work machine modules 4A to 4I are arranged, is the left-right direction, and the depth direction of machine tool apparatus 1, intersecting the arrangement direction of work machine modules 4A to 4I, is the front-rear direction.

The multiple work machine modules 4A to 4I are arranged in a row in the left-right direction and constitute one manufacturing line. Further, work machine modules 4A to 4I are arranged at equal intervals and in such a manner that their side walls are close to each other. Among work machine modules 4A to 4I, as described later, there are multiple types of modules whose work contents differ depending on the workpiece. However, work machine modules 4A to 4I normally have the same dimensions and appearance regardless of the type. As a result, machine tool apparatus 1 of the present embodiment has a uniform sense of appearance.

Further, the length of work machine modules 4A to 4I in the left-right direction is made considerably smaller than the length in the front-rear direction. On the other hand, base units 2A to 2E have a length corresponding to work machine modules 4A to 4I placed on top of the base units. For example, in base unit 2A, the length in the left-right direction is substantially equal to the length in the left-right direction of a work machine module when one work machine module is placed on top of base unit 2A. The length in the left-right direction of each of base units 2B to 2E is substantially equal to the length in the left-right direction of work machine modules when two work machine modules are placed side by side. That is, base 3 is made to have a length, in the left-right direction, to exactly accommodate nine work machine modules 4A to 4I. From the above-described configuration, machine tool apparatus 1 of the present embodiment can have a relatively short whole-apparatus length in the arrangement direction even when nine work machine modules 4A to 4I are arranged in the arrangement direction.

Base units 2A to 2E constituting base 3 are fixed to each other and constitute a single base. As described above, in base 3, two of work machine modules 4B to 4I can be placed on each of base units 2B to 2E except for base unit 2A. The four base units 2B to 2E are each standardized and have the same shape, dimensions, and structure. Therefore, it is possible to increase or decrease the number of base units constituting base 3 as appropriate. Accordingly, the number of work machine modules to be arranged can be freely changed. In the present embodiment, base 3 is composed of multiple base units 2A to 2E, but base 3 may be composed of a single unit without being divided into base units 2A to 2E.

Figure 2:
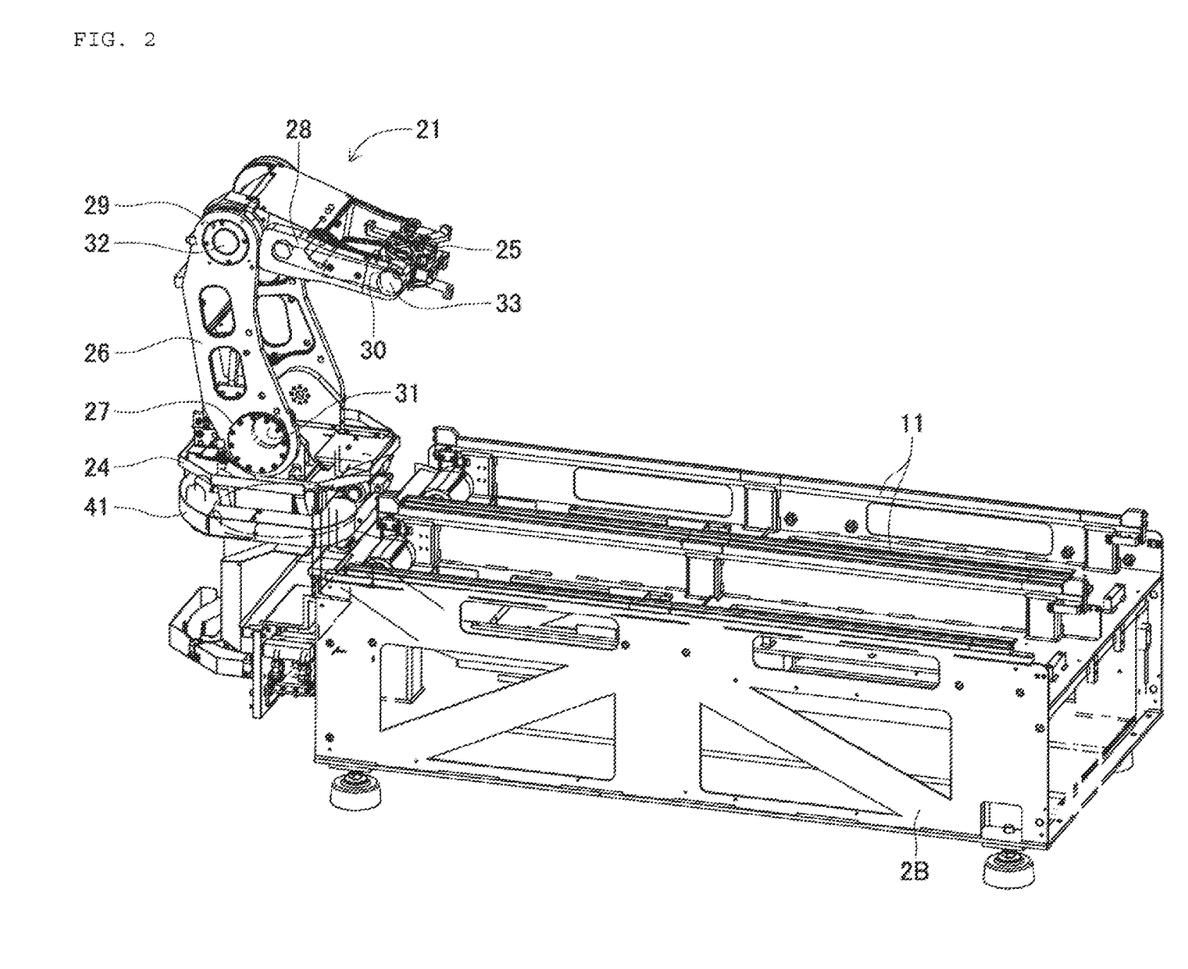
FIG. 2 is a view showing the inner structure of base unit 2B.

Next, the inner structure of base units 2A to 2E will be described. FIG. 2 is a diagram showing the inner structure of base unit 2B. Base units 2A to 2E have the same basic configuration differing only in the number of work machine modules that can be placed on top. Therefore, only base unit 2B will be described below, and descriptions of other base units 2A, 2C to 2E will be omitted.

As shown in FIG. 2, base unit 2B is provided with a number of rails 11 corresponding to the number of work machine modules placed on base unit 2B. In the present embodiment, since two work machine modules 4B, 4C are placed on base unit 2B, two pairs of rails 11 are provided side by side in the front-rear direction. Rails 11 define a trajectory along which the work machine module moves when the work machine module is pulled out. Wheels 4 corresponding to rails 11 are provided on the faces of work machine modules 4B, 4C in contact with base 3. By moving the wheels on rails 11, the user can easily move work machine modules 4B, 4C in the front-rear direction with respect to base unit 2B.

Further, the user can move work machine modules 4B, 4C to a position enabling detachment from base unit 2B. As a result, the user can easily replace or rearrange a part of work machine modules 4A to 4I arranged on base 3.

Controllers 5 are disposed on the front wall of the work machine modules 4A to 4I. Controller 5 includes a liquid crystal display as a device for displaying information and various operation buttons as operation accepting devices for accepting operations from a user. As a result, controller 5 accepts various operations relating to machine tool apparatus 1 and displays the current operation state, settings, and the like of machine tool apparatus 1. Further, a touch panel is disposed on the front face of the liquid crystal display. As a result, controller 5 is also configured to perform operations through the use of the touch panel. Controller 5 is also used for inputting various parameters for conveying the arm orientation of machine tool apparatus 1. In the embodiment shown in FIG. 1, controllers 5 are disposed in only some of work machine modules 4B to 4H, but controllers 5 may be disposed in all work machine modules 4A to 4I.

(Configuration of Work Machine Module)

Machine tool apparatus 1 described above performs a series of manufacturing-related operations and the like on a workpiece using various tools and the like to manufacture a final product. More specifically, work machine modules 4A to 4I arranged in the manufacturing line sequentially perform work on one workpiece.

Here, there are multiple types of work machine modules 4A to 4I, and work contents are determined for each type. For example, in the present embodiment, there is a convey-in module in which a workpiece is put into machine tool apparatus 1, a lathe module in which lathe-turning is performed, a drill module in which drilling by a drill, milling, and the like are performed, and a measurement module in which a predetermined item of the workpiece is measured. Further, there is an ID module for marking a workpiece ID (Identification) on the workpiece, a bobbing module for performing a bobbing process on the workpiece, a deburring module for deburring the workpiece, a cleaning module for cleaning the workpiece, a temporary placement module for temporarily placing the workpiece, and a convey-out module for discharging the workpiece from the inside of machine tool apparatus 1.

Which type of work machine module is arranged on base 3 differs depending on the work content of the corresponding workpiece. Also, the number of work machine modules arranged with respect to base 3 differs depending on the work content of the corresponding workpiece. In addition, except for some of the work machine modules, the order of arrangement of the work machine modules can be changed in any way by the user in accordance with the work contents.

As an example of an arrangement of the work machine modules, the example in FIG. 1 shows a convey-in/temporary-placement module as work machine module 4A disposed on the leftmost side of base 3, in which the workpiece is inserted and temporarily placed, while a convey-out/temporary-placement module as work machine module 4I disposed on the rightmost side of base 3, in which the workpiece is discharged and temporarily placed. A lathe module, a measurement module, a drilling module, an ID/temporary-placement module, a bobbing module, a deburring module, and a cleaning module are arranged, in this order from the left side as work machine modules 4B to 4H, between the convey-in/temporary-placement module and the convey-out/temporary-placement module. In the present embodiment, the drilling module (i.e., work machine module 4D) performs a drilling process using a drill. In the ID/temporary-placement module (i.e., work machine module 4E), the workpiece is marked and temporarily placed.

Further, machine tool apparatus 1 includes arm 21 as a conveyance device for transferring the workpiece in the arrangement direction of work machine modules 4A to 4I, as a reversing device of the workpiece, as a mounting device for mounting the workpiece to a work position, and as a detaching device for detaching the workpiece from the work position. The number of arms 21 provided in machine tool apparatus 1 is proportional to the number of base units 2A to 2E. Normally, one arm 21 is disposed for two base units, with two work machine modules disposed on each base unit (i.e. for a total of four work machine modules). For example, in the present embodiment, base 3 is composed of four base units 2B to 2E except for base unit 2A on which the convey-in module is placed. Therefore, two arms 21 are disposed on base 3.

Here, arm 21 is disposed on table 24 having substantially the same height as base 3 and is configured to move, together with table 24, in the left-right direction along rails provided on the side face of base 3, which is the arrangement direction of work machine modules 4A to 4I. That is, arm 21 can move in the left-right direction in front of the work space formed by base 3 and the outer walls of work machine modules 4A to 4I. Chuck 25 is provided at the distal end of arm 21 as a holding tool for holding the workpiece. Arm 21 is capable of moving chuck 25 holding the workpiece in the work space of work machine modules 4A to 4I. As a result, the workpiece can be conveyed between the multiple work machine modules 4A to 4I.

Further, arm 21 is a multi-joint type arm as shown in FIG. 2, and has multiple joint portions that enable control of the orientation of arm 21. More specifically, arm 21 includes first joint 27 at a connecting portion between table 24 and first arm 26, second joint 29 at a connecting portion between first arm 26 and second arm 28, and third joint 30 at a connecting portion between second arm 28 and chuck 25. Arm 21 has a drive shaft for displacing the angle of arm 21 at each joint. Accordingly, the user can displace the angle of first arm 26 with respect to table 24 by driving drive shaft 31 of first joint 27 (hereinafter referred to as first drive shaft 31). Further, the user can displace the angle of second arm 28 with respect to first arm 26 by driving drive shaft 32 of second joint 29 (hereinafter referred to as second drive shaft 32). Further, the user can displace the angle of chuck 25 with respect to second arm 28 by driving drive shaft 33 of third joint 30 (hereinafter referred to as third drive shaft 33). A servomotor or the like is used as a driving source for each of drive shafts 31 to 33.

Figure 3:
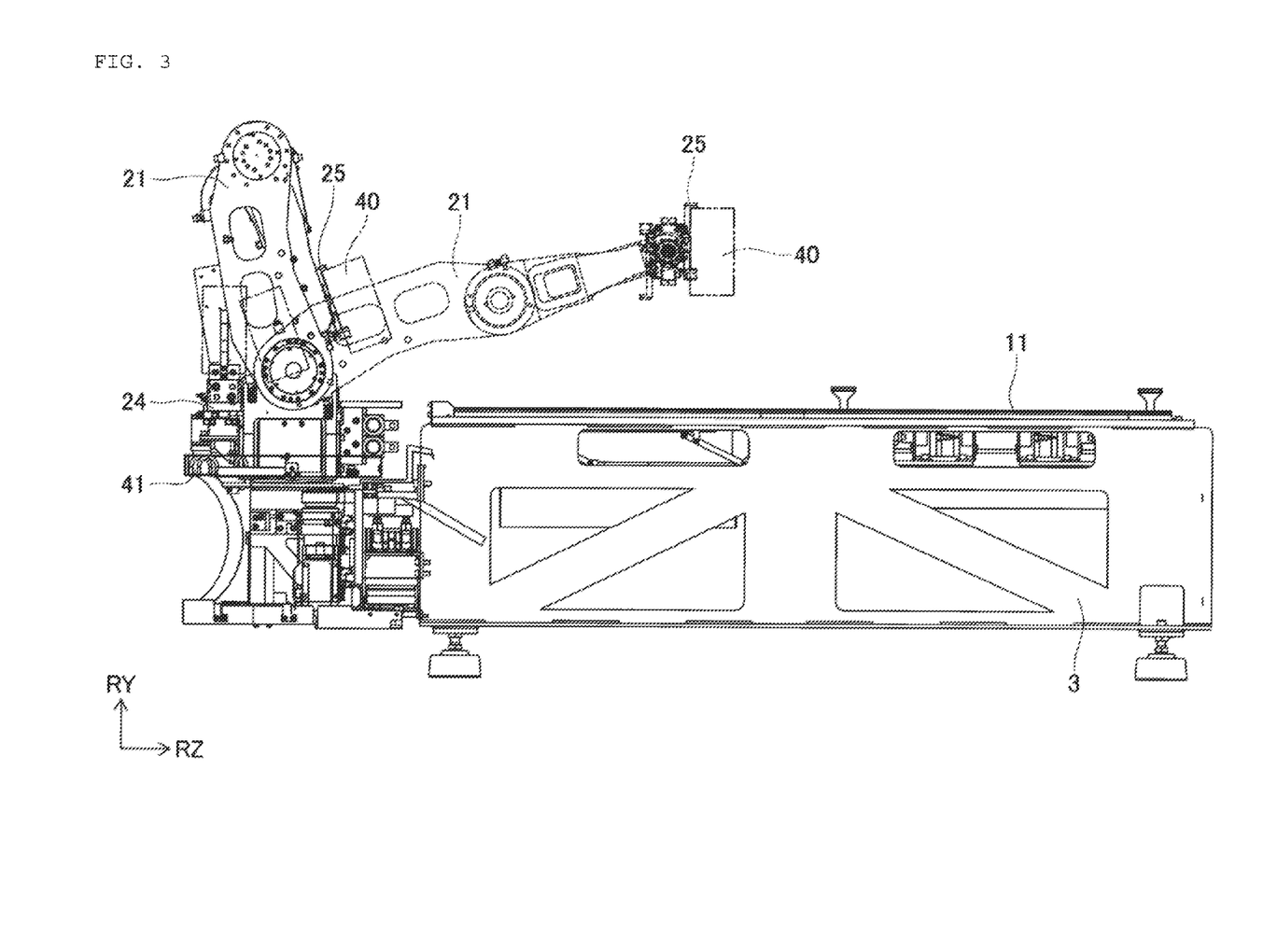
FIG. 3 is a view showing an example of an operational state of arm 21.

Therefore, arm 21 can freely control the orientation of arm 21 by the driving of drive shafts 31 to 33. For example, as shown in FIG. 3, arm 21 can freely move workpiece 40 held by chuck 25 in the space by folding arm 21 or extending arm 21. Further, arm 21 can invert workpiece 40 by 180 degrees by the rotational driving of third drive shaft 33. When the up-down direction is the RY axis and the front-rear direction is the RZ axis, arm 21 can also displace the RZ value (i.e., move workpiece 40 in the horizontal direction) while maintaining the RY value of workpiece 40 by driving of drive shafts 31 to 33. Similarly, arm 21 can also displace the RY (i.e., move workpiece 40 in the vertical direction) value while maintaining the RZ value of workpiece 40. As a result, arm 21 can extend arm 21 to the work position of work machine modules 4A to 4I and, with chuck 25, attach workpiece 40 to or detach workpiece 40 from the work position.

Below table 24, arm rotation device 41 is provided. By rotating table 24 in the horizontal direction, arm rotation device 41 can also rotate arm 21 on table 24, thereby controlling the direction of entire arm 21.

In machine tool apparatus 1, workpiece 40 loaded into the leftmost convey-in/temporary-placement module (work machine module 4A) is moved rightward by arm 21, and is conveyed to the lathe module (work machine module 4B) adjacent to the right side of work machine module 4A. In the lathe module (work machine module 4B), the entire surface of workpiece 40 is turned on the lathe. Thereafter, workpiece 40 is moved rightward by arm 21, and is conveyed to the ID/temporary-placement module (work machine module 4E) located substantially at the center of the manufacturing line.

In the ID/temporary-placement module (work machine module 4E), a workpiece ID is marked on the front face of workpiece 40. Thereafter, workpiece 40 is moved by arm 21 in the leftward direction, opposite to the previous conveyance direction (rightward direction), and is conveyed to the measurement module (work machine module 4C). In the measurement module (work machine module 4C), predetermined items of workpiece 40 are measured. Thereafter, workpiece 40 is moved by arm 21 in the rightward direction, opposite to the immediately preceding conveyance direction (i.e., the leftward direction), and is conveyed to the drilling module (work machine module 4D) adjoining the right side of work machine module 4C.

In the drilling module (work machine module 4D), workpiece 40 is subjected to a milling process. Thereafter, workpiece 40 is moved rightward by arm 21 and is conveyed to ID/temporary-placement module (work machine module 4E) adjoining the right side of work machine module 4D. In the ID/temporary-placement module (work machine module 4E), workpiece 40 is temporarily placed. Thereafter, workpiece 40 is moved rightward by arm 21, different from the previous arm 21, and is conveyed to the bobbing module (work machine module 4F) adjoining the right side of work machine module 4E.

In the bobbing module (work machine module 4F), bob machining is performed on workpiece 40. Thereafter, workpiece 40 is moved rightward by arm 21 and is conveyed to the deburring module (work machine module 4G) adjoining the right side of work machine module 4F. In the deburring module (work machine module 4G), deburring is performed on workpiece 40. Thereafter, workpiece 40 is moved rightward by arm 21 and is conveyed to the cleaning module (work machine module 4H) adjoining the right side of work machine module 4G.

In the cleaning module (work machine module 4H), cleaning is performed on workpiece 40. Thereafter, workpiece 40 is moved rightward by arm 21, and is conveyed to the convey-out/temporary-placement module (work machine module 4I) adjoining the right side of work machine module 4H. In the convey-out/temporary-placement module (work machine module 4I), workpiece 40 is discharged.

In this manner, a series of manufacturing-related operations are performed in each of work machine modules 4A to 4I. Therefore, the turning work of the lathe module (work machine module 4B) corresponds to a predetermined manufacturing-related operation. Further, the measurement operation of the measurement module (work machine module 4C), the milling operation of the drilling module (work machine module 4D), the bobbing process of the bobbing module (work machine module 4F), the deburring operation of the deburring module (work machine module 4G), and the cleaning operation of the cleaning module (work machine module 4H) correspond to manufacturing-related operations which follow the predetermined manufacturing-related operation.

Further, in the ID/temporary-placement module (work machine module 4E), the workpiece ID is marked on an area (i.e., a surface that is not a target for manufacturing) of the surface of workpiece 40 where neither milling of the drill module (work machine module 4D), bobbing process of the bobbing module (work machine module 4F), nor deburring of the deburring module (work machine module 4G) is performed. The workpiece ID is a two-dimensional code, for example, a stacked or matrix code and is an individual information for identifying workpiece 40. The workpiece ID may be a one-dimensional code (e.g., a bar code).

The user performs a first predetermined operation with controller 5 when performing a visual inspection on workpiece 40 after an operation has been completed with any of the work machine modules including the measurement module (work machine module 4C), the drilling module (work machine module 4D), the bobbing module (work machine module 4F), the deburring module (work machine module 4G), and the cleaning module (work machine module 4H). As a result, the series of manufacturing-related operations in work machine modules 4A to 4I is interrupted and workpiece 40 is temporarily placed by arm 21 on any of work machine modules of convey-in/temporary-placement module (work machine module 4A), the ID/temporary-placement module (work machine module 4E), and the convey-out/temporary-placement module (work machine module 4I). The temporarily placed workpiece 40 is taken out from work machine modules 4A, 4E, 4I by the user and visually inspected.

The visually inspected workpiece 40 is temporarily placed by the user on any of the work machine modules, including the convey-in/temporary-placement module (work machine module 4A), the ID/temporary-placement module (work machine module 4E), and the convey-out/temporary-placement module (work machine module 4I). Further, when the user performs a second predetermined operation with controller 5, the temporarily placed workpiece 40 is conveyed by arm 21 to the work machine module in which the next operation is performed, the next operation being the operation following the operation finished immediately before the visual inspection. As a result, the series of manufacturing-related operations in work machine modules 4A to 4I is resumed. Such an operation of arm 21 (hereinafter referred to as a reloading operation of arm 21) is performed in accordance with a control program shown in the flowchart of FIG. 5 described later.

(Control Configuration of Machine Tool Equipment)

Figure 4:
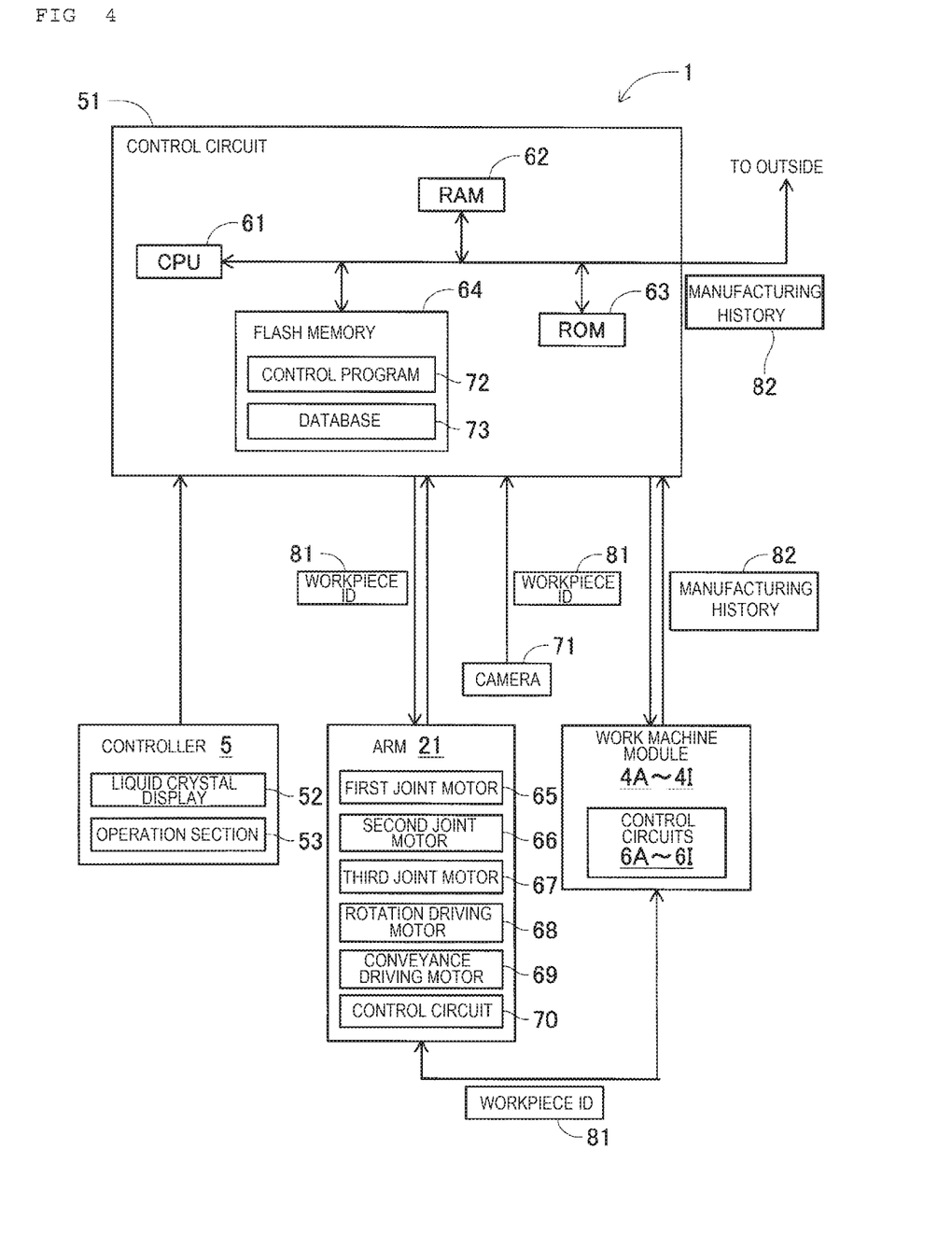
FIG. 4 is a block diagram showing machine tool apparatus 1 of the present embodiment.

Next, a control configuration of machine tool apparatus 1 of the present embodiment will be described with reference to FIG. 4. FIG. 4 is a block diagram showing machine tool apparatus 1 of the present embodiment.

As shown in FIG. 4, machine tool apparatus 1 of the present embodiment normally includes control circuit 51, which is an electronic control unit that controls the entire machine tool apparatus 1, controller 5 that accepts user operations and displays data, above-described work machine modules 4A to 4I connected via a LAN (local area network) or the like, arm 21, cameras 71, and the like. As described above, the number of work machine modules 4A to 4I and the number of arms 21 corresponds to the number of base units.

Here, controller 5 includes liquid crystal display 52 for displaying the current operation state, current settings, and the like of machine tool apparatus 1, and operation section 53 as an operation reception device for accepting user operations. Note that operation section 53 may be hard buttons or a touch panel disposed on the front face of liquid crystal display 52. The user then confirms the display content of liquid crystal display 52 and operates operation section 53 to perform various operations on machine tool apparatus 1.

Control circuit 51 includes CPU 61, as an arithmetic device and a control device, and further includes an internal storage device such as flash memory 64 for storing programs read out from RAM 62, ROM 63, ROM 63 used as working memory devices when CPU 61 performs various arithmetic processes.

Flash memory 64 stores information required for processes performed by CPU 61, for example, control program 72 and the like. Control program 72 includes a manufacturing control program of machine tool apparatus 1, a control program shown in the flowchart of FIG. 5 to be described later, and the like. Further, database 73 described later is provided.

Control circuit 51 reads out the control program from flash memory 64, and outputs control signals to work machine modules 4A to 4I, arms 21, cameras 71, and the like in accordance with the read out control program, thereby controlling machine tool apparatus 1. Work machine modules 4A to 4I, arms 21, and cameras 71 that have received the control signals drive the respective driving sources and the like in accordance with the received control signals.

For example, arm 21 includes first joint motor 65 for rotationally driving first drive shaft 31 of first joint 27, second joint motor 66 for rotationally driving second drive shaft 32 of second joint 29, third joint motor 67 for rotationally driving third drive shaft 33 of third joint 30, and rotation driving motor 68 for rotationally driving arm rotation device 41. Further, arm 21 is provided with conveyance driving motor 69 for moving arm 21 in the left-right direction, which is the arrangement direction of work machine modules 4A to 4I. Motors 65 to 69 are, for example, servomotors or the like. In machine tool apparatus 1, each of motors 65 to 69 is driven in accordance with control signals outputted from control circuit 51 so that arm 21 can be maneuvered to any orientation and position.

However, in the present embodiment, arm 21 performs overall control of arm 21 via control circuit section 70 having the same configuration as that of control circuit 51. Therefore, control circuit 51 can control arm 21 via control circuit 70 of arm 21. Work machine modules 4A to 4I are individually provided with control circuits 6A to 61 having the same configuration as control circuit 51. Work machine modules 4A to 4I individually control entire work machine modules 4A to 4I with control circuits 6A to 61. Therefore, control circuit 51 can control work machine modules 4A to 4I through control circuits 6A to 61 of work machine modules 4A to 4I.

The manufacturing control program stored in flash memory 64 corresponds to the manufacturing-related operation performed in machine tool apparatus 1. That is, flash memory 64 stores process control programs in accordance with the series of manufacturing-related operations performed by the multiple work machine modules 4A to 4I. In cases where machine tool apparatus 1 is capable of performing multiple types of manufacturing-related operations, a manufacturing control program corresponding to each operation in the series of manufacturing-related operations that can be performed is stored in flash memory 64. In machine tool apparatus 1, manufacturing processes are performed on the workpiece in each of work machine modules 4A to 4I in the order specified in the processing control programs.

Further, control circuit 51 outputs, to arm 21 that takes out workpiece 40 from the ID/temporary-placement module (work-machine module 4E), workpiece identification information (hereinafter referred to as workpiece ID 81) marked by ID/temporary-placement module (work-machine module 4E) on workpiece 40.

Arm 21 that has received workpiece ID 81 outputs received workpiece ID 81 to the measurement module (work machine module 4C) when workpiece 40 is moved to the measurement module (work machine module 4C). Thereafter, the measurement module (work machine module 4C)

outputs received workpiece ID 81 to arm 21 which takes out workpiece 40 from the measurement module (work machine module 4C).

In this manner, arm 21 transmits and receives workpiece ID 81 to and from the measurement module (work machine module 4C), the drilling module (work machine module 4D), the ID/temporary-placement module (work machine module 4E), the bobbing module (work machine module 4F), the deburring module (work machine module 4G), and the cleaning module (work machine module 4H).

Further, in the measurement module (work machine module 4C), the drilling module (work machine module 4D), the bobbing module (work machine module 4F), the deburring module (work machine module 4G), and the cleaning module (work machine module 4H), manufacturing history 82, related to each manufacturing-related operation, is outputted to control circuit 51 together with workpiece ID 81 received from arm 21.

Control circuit 51 then stores manufacturing history 82 received from workpiece machine modules 4C to 4H in database 73 of flash memory 64 linked with workpiece ID 81 received together with manufacturing history 82. Manufacturing history 82 includes, for example, IDs of work machine modules, IDs of tools used, processing start times, processing end times, and the like.

Control circuit 51 may link manufacturing history 82 received from the ID/temporary-placement module (work machine module 4E) with workpiece ID 81 marked on workpiece 40 by ID/temporary-placement module (work machine module 4E), and store manufacturing history 82 in database 73 of flash memory 64. Further, control circuit 51 may link manufacturing history 82 received from the lathe module (work machine module 4B) with workpiece ID 81 to be marked on workpiece 40 conveyed from the lathe module (work machine module 4B) to the ID/temporary-placement module (work machine module 4E), and store manufacturing history 82 in database 73 of flash memory 64.

Further, control circuit 51 outputs all manufacturing histories 82 stored in database 73, of which history being received with corresponding workpiece ID 81, to the host computer or the like, which is connected to control circuit 51 via a local area network (LAN) or the like, together with workpiece ID 81, upon receiving manufacturing history 82 from, for example, the cleaning module (work machine module 4H). Such outputting to the outside may be performed when control circuit 51 receives a signal transmitted in response to discharging workpiece 40 from the convey-out/temporary-placement module (work-machine module 4I).

As described above, machine tool apparatus 1 of the present embodiment provides traceability of the series of manufacturing-related operations performed by multiple work machine modules 4B to 4H with workpiece ID 81 marked on workpiece 40 by the ID/temporary-placement module (work machine module 4E).

Cameras 71 are provided in the convey-in/temporary-placement module (work machine module 4A), the ID/temporary placement module (work machine module 4E), and convey-out/temporary-placement module (work machine module 4I). In accordance with control signals received from control circuit 51, cameras 71 image workpiece ID 81 of workpiece 40 temporarily placed in work machine modules 4A, 4E, 4I. Workpiece ID 81 imaged with cameras 71 is outputted to control circuit 51.

(Re-Loading Operation by Arm)

Figure 5:
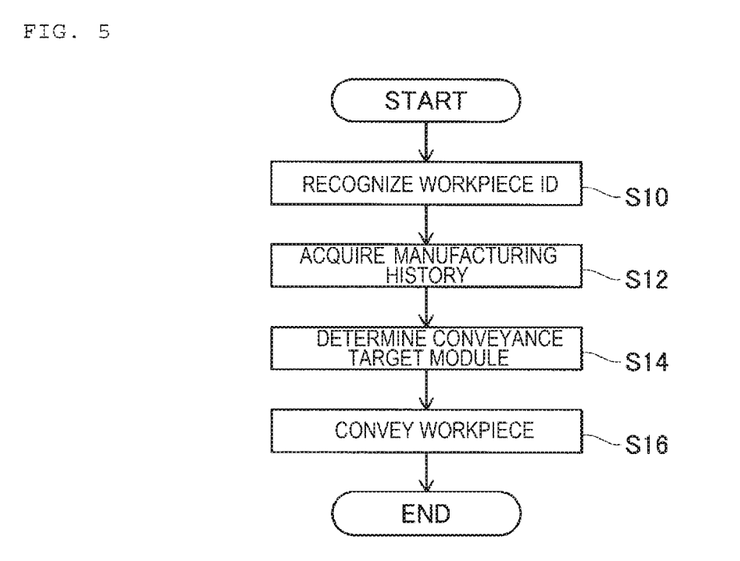
FIG. 5 is a flowchart showing a control program for a re-loading operation of arm 21.

Next, a control program of the re-loading operation of arm 21 will be described with reference to the flowchart of FIG. 5. The control program shown in the flowchart of FIG. 5 is stored in flash memory 64 provided in control circuit 51 and is executed by CPU 61 when the user performs the second predetermined operation with controller 5.

First, CPU 61 performs a process of recognizing workpiece ID 81 (S10). In this process, CPU 61 transmits control signals to cameras 71 of work machine module, among work machine modules 4A, 4E, 4I, in which workpiece 40 is temporarily placed. As a result, cameras 71 image workpiece ID 81 of temporarily placed workpiece 40 and transmit the captured image data to control circuit 51. CPU 61 recognizes workpiece ID 81 by image-processing the captured image data with control circuit 51. The identification of the work machine module on which workpiece 40 is temporarily placed is performed with, for example, a transmission signal from arm 21 on which workpiece 40 is temporarily placed, a detection signal from a sensor within work machine modules 4A, 4E, 4I on which workpiece 40 is temporarily placed, or the second predetermined operation with controller 5, or the like.

Next, CPU 61 performs a process of acquiring processing history 82 (step S12). In this process, CPU 61 acquires all manufacturing histories 82 linked with workpiece ID 81 recognized in S10 from database 73 of flash memory 64.

Next, CPU 61 performs a process of determining the conveyance target modules (step S14). In this process, CPU 61 determines the conveyance target modules of the temporarily-placed workpieces 40 based on all manufacturing histories 82 acquired in S12. Specifically, CPU 61 identifies work machine modules for which manufacturing history 82 could not be acquired in step S12 among work machine modules 4C, 4D, 4F, 4G, 4H and designates, from among the identified work machine modules, the work machine module on which the workpiece will be first processed as the conveyance target module.

Next, CPU 61 conveys out workpiece 40 (step S16). In this process, CPU 61 transmits control signals to arm 21 in order to convey workpiece 40 temporarily placed in work machine modules 4A, 4E, 4I to the work machine module designated as the conveyance target module in step S14. In this way, temporarily placed workpiece 40 is conveyed by arm 21 to the work machine module which was designated the conveyance target module.

In the present embodiment, arm 21 is an example of a robot. The ID/temporary-placement module (work machine module 4E) is an example of an individual information-providing device. Workpiece ID 81 is an example of an individual information. Flash memory 64 is an example of a storage device. CPU 61 is an example of a control device. Camera 71 is an example of a reader.

(Modifications)

It should be noted that the present disclosure is not limited to the above-described embodiments, and various modifications can be made without departing from the spirit thereof. For example, in the present embodiment, the convey-in/temporary-placement module (work machine module 4A), the ID/temporary-placement module (work machine module 4E), or the convey-out/temporary-placement module (work machine module 4I) are disposed on base 3, but may be disposed independently of base 3.

Further, in the present embodiment, cameras 71 are provided in the convey-in/temporary-placement module (work machine module 4A), the ID/temporary-placement module (work machine module 4E), and the convey-out/temporary-placement module (work machine module 4I), but may be provided on arm 21, or may be provided in the moving space of arm 21 that moves in the left-right direction in front of the work spaces of work machine modules 4A to 4I.

Further, in the present embodiment, workpiece ID 81 may be an RFID (Radio Frequency Identification embedded in workpiece 40). In such cases, camera 71 is replaced with readers for reading RFID individual information. Further, the ID/temporary-placement module (work machine module 4E) uses a writer to write the RFID individual information. However, the writer is not necessary when the information is written in the RFID individual information in advance.

In the present embodiment, arm 21 is controlled by control circuit 70, and work machine modules 4A to 4I are individually controlled by control circuits 6A to 61, but arm 21 and work machine modules 4A to 4I may made to be controlled only by control circuit 51.

Further, in the present embodiment, although two work machine modules 4A to 4I are normally placed on one base unit, one work machine module or three or more work machine modules may be installed on one base unit.

As examples of types of work machine modules, the present embodiment describes a convey-in module in which a workpiece is inserted into machine tool apparatus 1, a lathe module in which lathe-turning is performed, a drill module in which drilling with a drill, milling, or the like is performed, and a measurement module in which a predetermined item of the workpiece is performed. Furthermore, as examples of work machine modules, the present embodiment describes an ID module in which a workpiece is marked with a workpiece ID, a bobbing module in which bobbing of a workpiece is performed, a deburring module in which deburring of a workpiece is performed, a cleaning module in which cleaning of a workpiece is performed, a temporary placement module in which a workpiece is temporarily placed, and a convey-out module in which a workpiece is discharged from machine tool apparatus 1, a work machine module of a type other than the above may also be used.

In the present embodiment, arm 21 comprises first drive shaft 31, second drive shaft 32, and third drive shaft 33 as drive shafts, but the number of drive shafts of arm 21 may be any number.

In the present embodiment, the position coordinates of the arm distal end are used as parameters for controlling the orientation of arm 21, but other parameters may be used. For example, the angle of first drive shaft 31, the angle of second drive shaft 32, the angle of third drive shaft 33, or position coordinates of first joint 27 and second joint 29 may be used as parameters.

REFERENCE SIGNS LIST

1 Machine tool apparatus, 4A to 4I Work machine modules, 21 arm, 61 CPU, 64 Flash memory, 71 Camera, 81 Workpiece ID, 82 individual information

The invention claimed is:

1. A machine tool apparatus comprising:
multiple work machine modules being disposed adjacent to one another in a predetermined order and being configured to sequentially perform a series of manufacturing-related operations on a workpiece;
a plurality of robot arms configured to convey the workpiece between the multiple work machine modules;
an individual information-providing device, being disposed at a single location within the predetermined order after at least two of the multiple work machine modules such that the single location is accessible by a least two of the plurality of robot arms that each convey the workpiece among separate groups of the multiple work machine modules, and configured to provide an individual information to the workpiece conveyed into the multiple work machine modules and subjected to manufacturing-related operations;
a storage device that stores at least a control program; and
a control device configured to link the manufacturing history of manufacturing-related operations performed on the workpiece by the multiple work machine modules and store the linked manufacturing history in the storage device, the workpiece being a workpiece to which the individual information was provided by the individual information-providing device,
wherein the individual information-providing device provides the individual information to a surface of the workpiece which is not to be machined in any manufacturing-related operations subsequent to at least one predetermined manufacturing-related operation in the multiple work machine modules, and
wherein the control device is configured to execute the control program to control at least one of the pluarlity of robot arms to provide the workpiece to the individual information-providing device out of order in the predetermined order subsequent to the at least one predetermined manufacturing-related operation.

2. The machine tool apparatus of claim 1, wherein the control device outputs, from the storage device to an external device, the individual information of the workpiece for which the series of manufacturing-related operations in the multiple work machine modules has been completed.

3. The machine tool apparatus of claim 1,
wherein the machine tool apparatus further comprises a reader configured to read the individual information;
wherein the control device executes:
a recognition process for recognizing the individual information of the workpiece by reading the individual information with the reader when the workpiece taken out from the multiple work machine modules is conveyed into the multiple work machine modules again;
an acquisition process for acquiring, from the storage device, the manufacturing history linked with the individual information recognized in the recognition process; and
a determination process for determining a work machine module, to which the at least one of the plurality of robot arms will convey the workpiece, from among any one of the multiple work machine modules, based on the manufacturing history acquired in the acquisition process.

* * * * *